United States Patent
Lozovoy

(10) Patent No.: US 9,182,801 B2
(45) Date of Patent: Nov. 10, 2015

(54) SCREEN BRIGHTNESS CONTROL FOR MOBILE DEVICE

(71) Applicant: LG ELECTRONICS INC., Seoul (KR)

(72) Inventor: Yury Lozovoy, Saint Petersburg (RU)

(73) Assignee: LG ELECTRONICS INC., Seoul (KR)

( * ) Notice: Subject to any disclaimer, the term of this patent is extended or adjusted under 35 U.S.C. 154(b) by 87 days.

(21) Appl. No.: 14/021,074

(22) Filed: Sep. 9, 2013

(65) Prior Publication Data

US 2014/0094224 A1 Apr. 3, 2014

(30) Foreign Application Priority Data

Oct. 2, 2012 (RU) .................................. 2012141986

(51) Int. Cl.
*H04M 1/00* (2006.01)
*G06F 1/32* (2006.01)
*H04M 1/22* (2006.01)

(52) U.S. Cl.
CPC ............... *G06F 1/3209* (2013.01); *H04M 1/22* (2013.01)

(58) Field of Classification Search
USPC ............... 455/550.1, 90.1, 567, 575.1, 556.1, 455/407, 412.2, 424, 425, 456.6, 566
See application file for complete search history.

(56) References Cited

U.S. PATENT DOCUMENTS

| | | | |
|---|---|---|---|
| 5,736,973 A | 4/1998 | Godfrey et al. | 345/102 |
| 7,793,225 B2 * | 9/2010 | Anzures et al. | 715/772 |
| 2001/0013854 A1 | 8/2001 | Ogoro | 345/102 |
| 2003/0193472 A1 * | 10/2003 | Powell | 345/102 |
| 2004/0012556 A1 | 1/2004 | Yong et al. | 345/102 |
| 2005/0270252 A1 | 12/2005 | Drader et al. | 345/30 |
| 2006/0148526 A1 * | 7/2006 | Kamiya et al. | 455/566 |
| 2007/0091060 A1 | 4/2007 | Drader et al. | 345/102 |
| 2007/0132710 A1 | 6/2007 | Tateuchi et al. | 345/102 |
| 2007/0132873 A1 * | 6/2007 | Hyodo | 348/333.01 |
| 2008/0119242 A1 * | 5/2008 | Cho | 455/574 |
| 2008/0165116 A1 * | 7/2008 | Herz et al. | 345/102 |
| 2009/0006991 A1 * | 1/2009 | Lindberg et al. | 715/763 |
| 2009/0017840 A1 * | 1/2009 | Camp et al. | 455/456.3 |
| 2009/0251560 A1 * | 10/2009 | Azar et al. | 348/222.1 |
| 2010/0079508 A1 * | 4/2010 | Hodge et al. | 345/697 |
| 2010/0190529 A1 * | 7/2010 | Morobishi | 455/566 |
| 2010/0261506 A1 * | 10/2010 | Rajamani et al. | 455/566 |
| 2010/0277326 A1 * | 11/2010 | Berk et al. | 340/636.11 |
| 2011/0069050 A1 * | 3/2011 | Sirmon et al. | 345/207 |

(Continued)

FOREIGN PATENT DOCUMENTS

EP 1 202 243 A2 5/2002
RU 2 284 570 C2 9/2006

(Continued)

OTHER PUBLICATIONS

Russian Office Action dated Aug. 29, 2013 issued in Application No. 2012141986 (with English translation).

*Primary Examiner* — Dominic E Rego
(74) *Attorney, Agent, or Firm* — KED & Associates, LLP

(57) ABSTRACT

A method, system, and device for controlling screen brightness of a mobile terminal are disclosed. In one embodiment, a mobile terminal comprises a display unit, a sensing unit, and a controller configured to maintain a brightness of the display unit at a reduced level of screen brightness during a non-active state of the mobile terminal, and restore the brightness of the display unit to a normal level of screen brightness after a short timeout subsequent to a detection of an event configured to activate the mobile terminal via the sensing unit.

19 Claims, 12 Drawing Sheets

(56) References Cited

U.S. PATENT DOCUMENTS

| | | | |
|---|---|---|---|
| 2011/0070888 A1* | 3/2011 | Iwamura et al. | 455/435.3 |
| 2011/0080422 A1* | 4/2011 | Lee et al. | 345/589 |
| 2011/0171962 A1* | 7/2011 | Iwamura et al. | 455/437 |
| 2011/0304536 A1* | 12/2011 | Chen | 345/157 |
| 2012/0120306 A1* | 5/2012 | Schindler et al. | 348/372 |
| 2012/0157065 A1* | 6/2012 | Yoshikawa et al. | 455/414.2 |
| 2013/0055001 A1* | 2/2013 | Jeong et al. | 713/323 |
| 2013/0111415 A1* | 5/2013 | Newman et al. | 715/864 |
| 2013/0194172 A1* | 8/2013 | Shyamalan | 345/156 |

FOREIGN PATENT DOCUMENTS

| | | |
|---|---|---|
| RU | 2 431 802 C2 | 10/2011 |
| RU | 2010121867 A | 12/2011 |

* cited by examiner

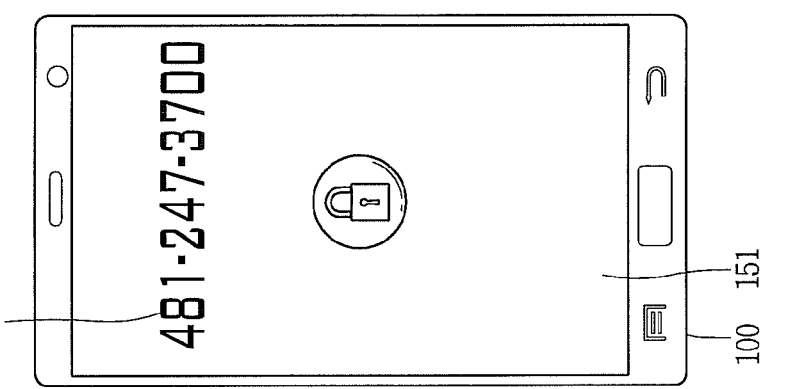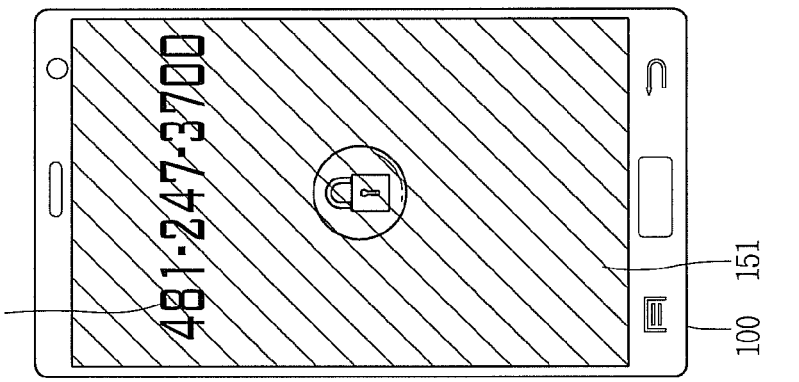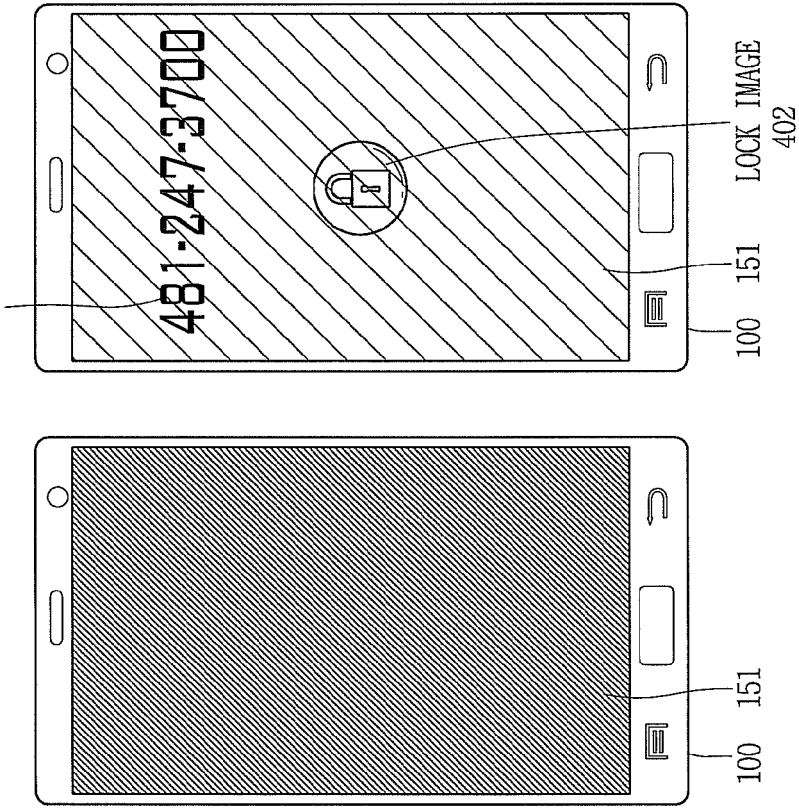

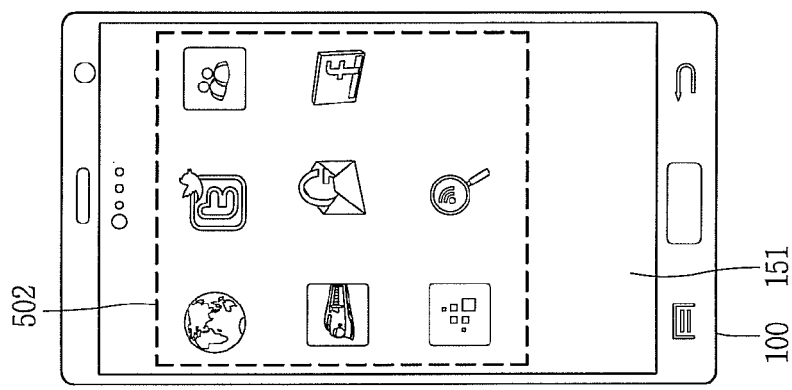
FIG. 5A
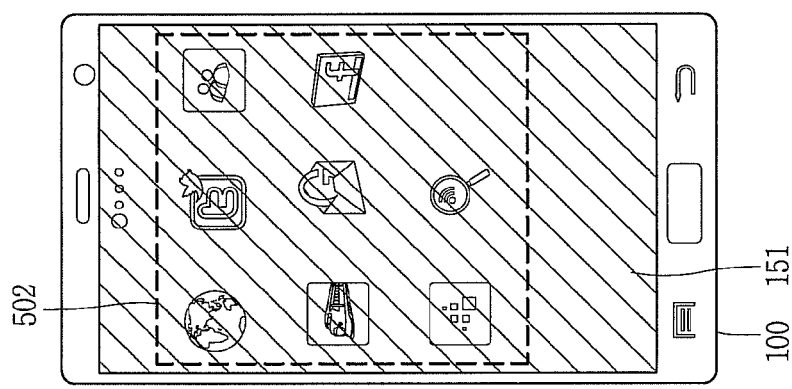
FIG. 5B
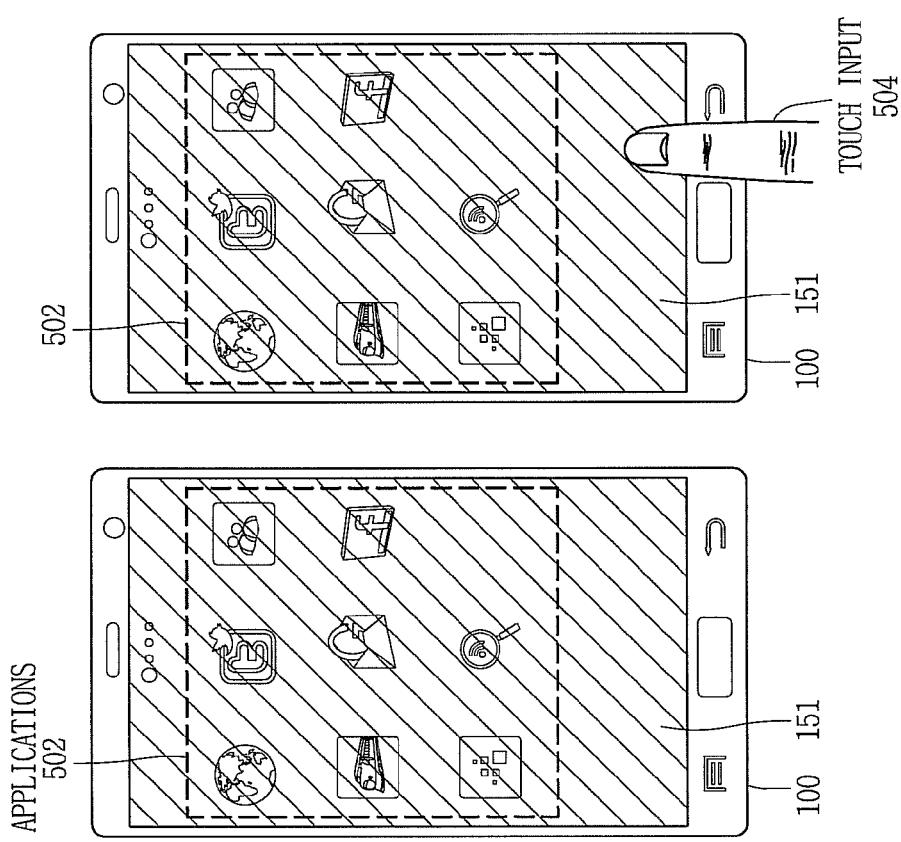
FIG. 5C
FIG. 5D

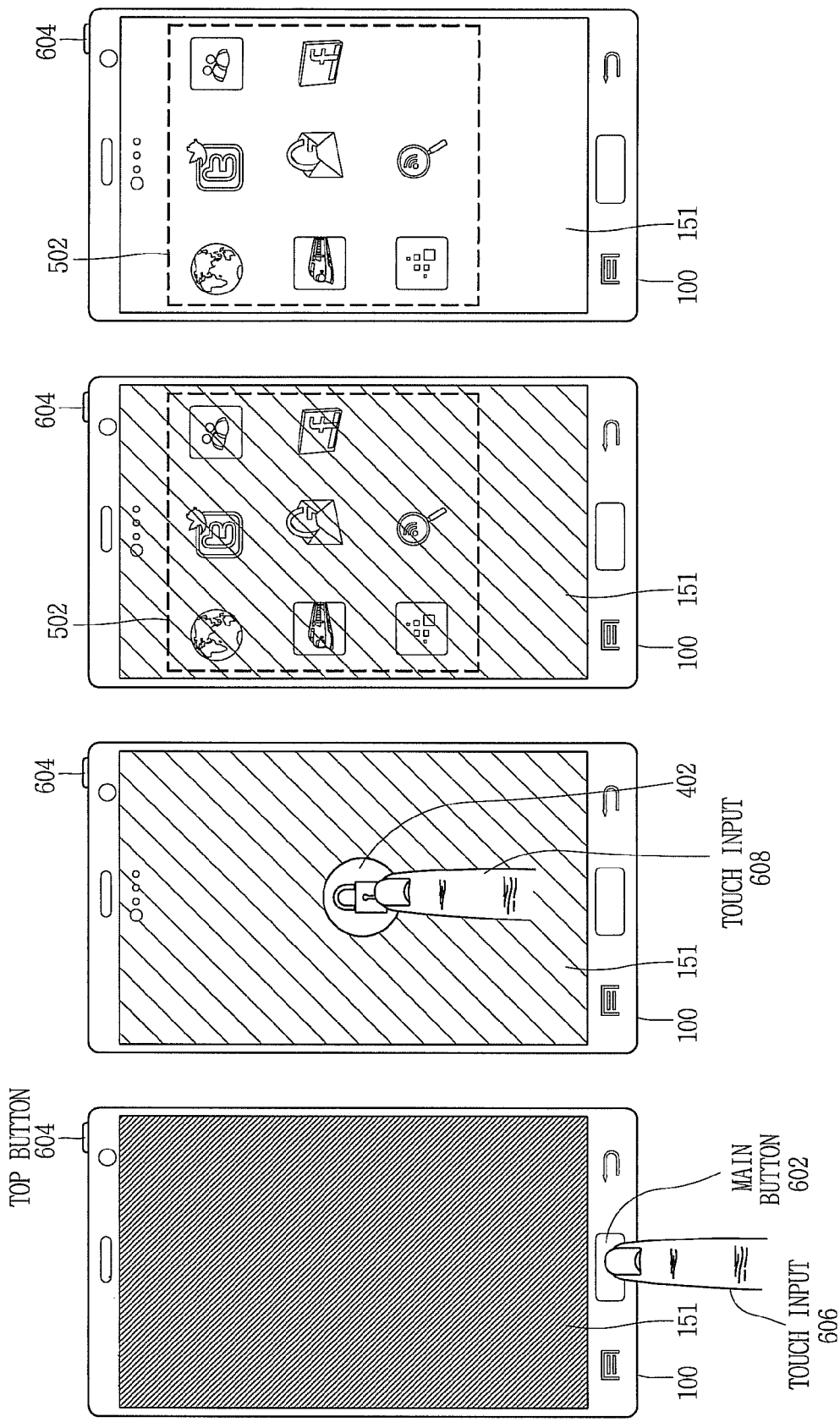

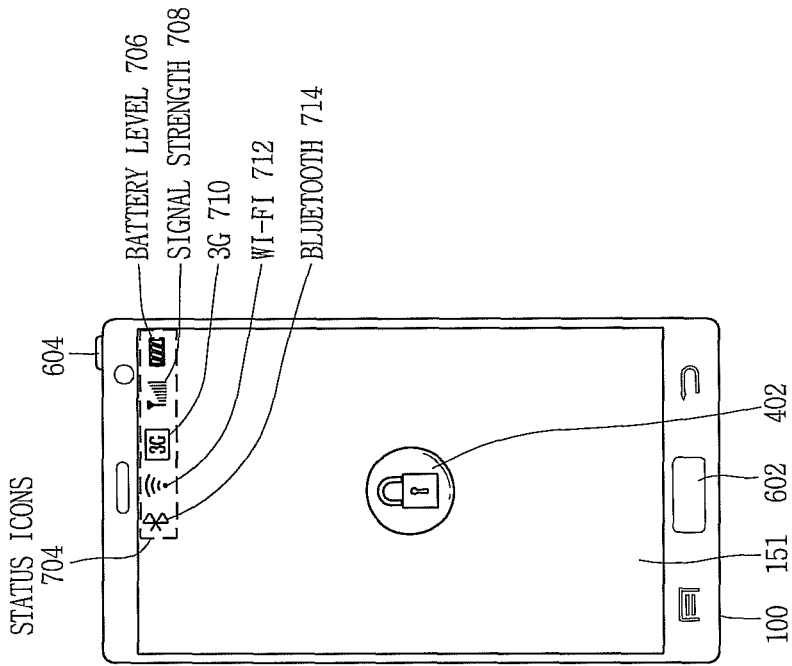
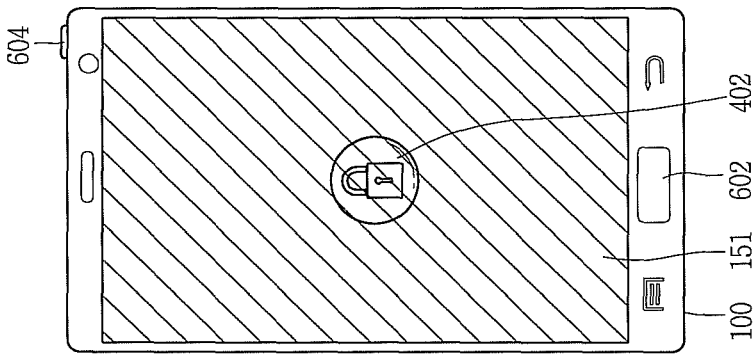
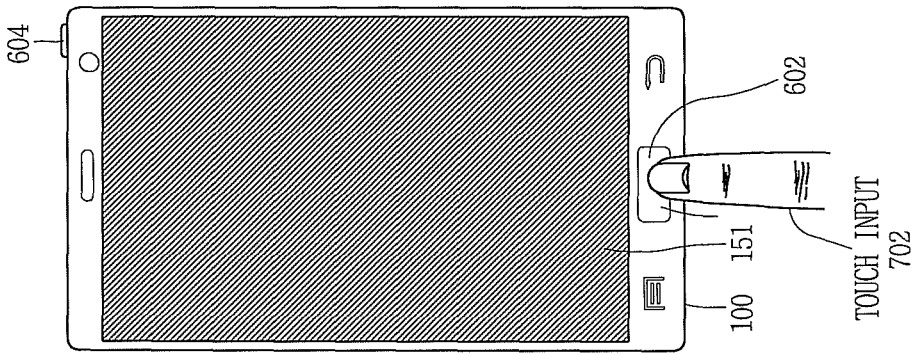

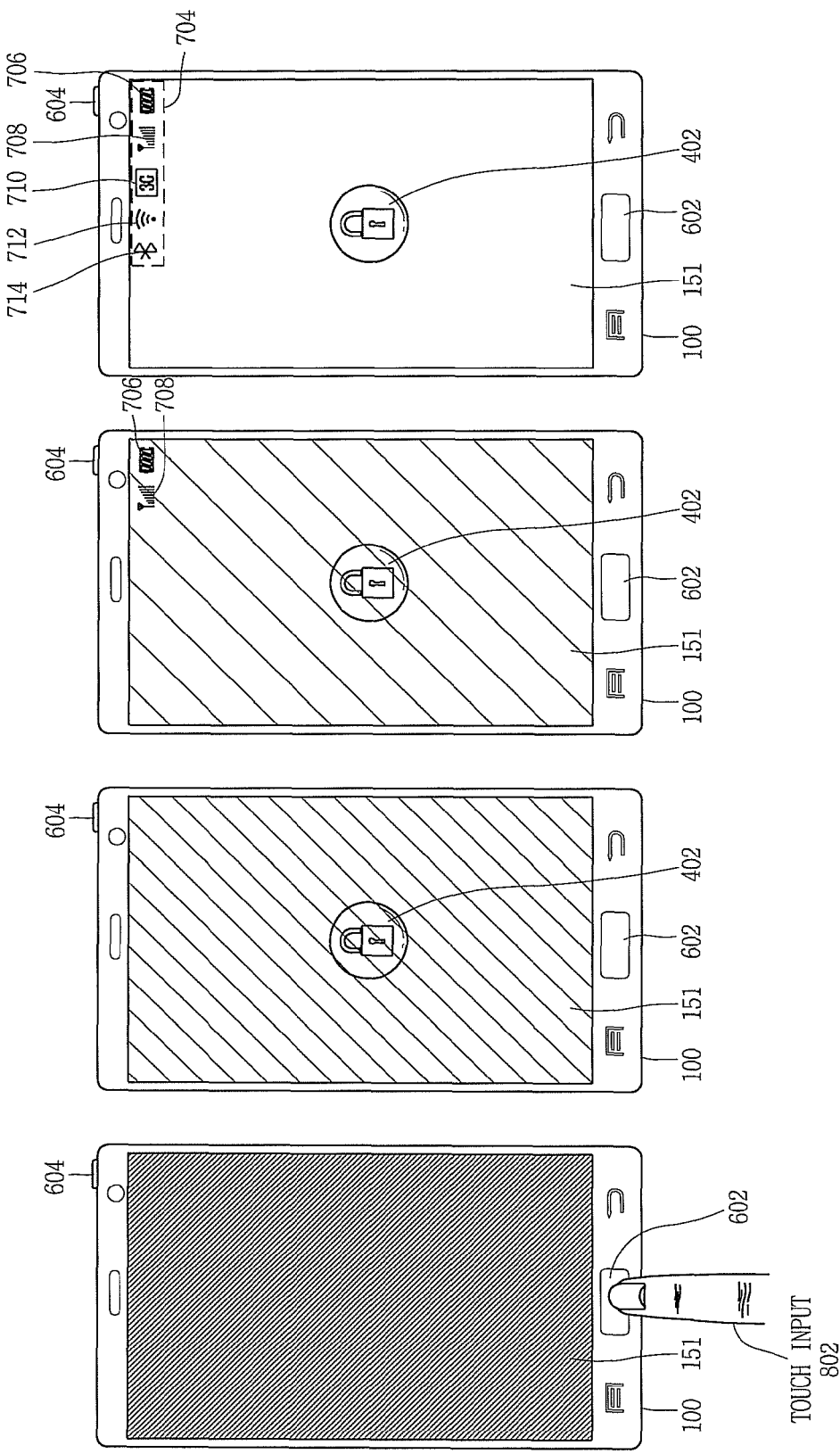

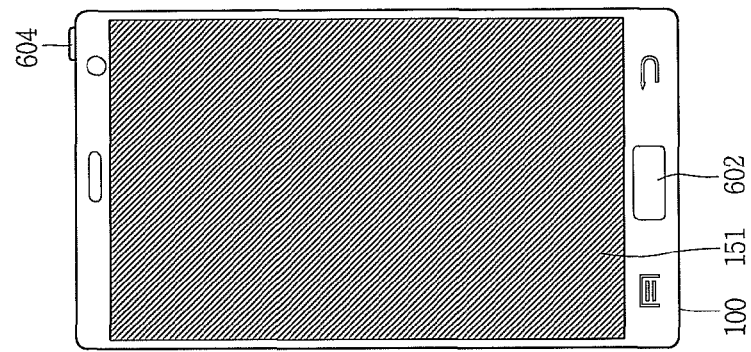
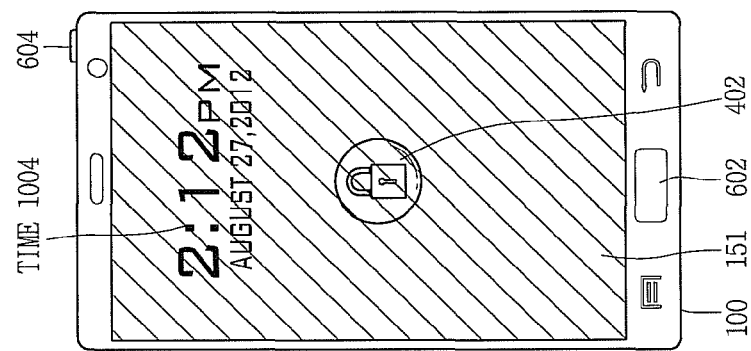
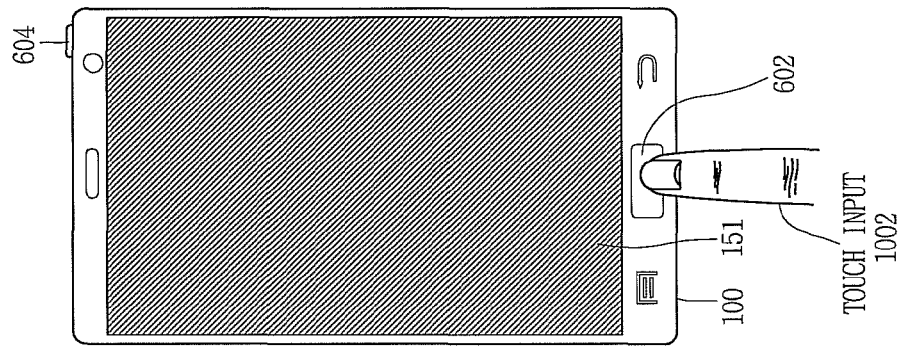

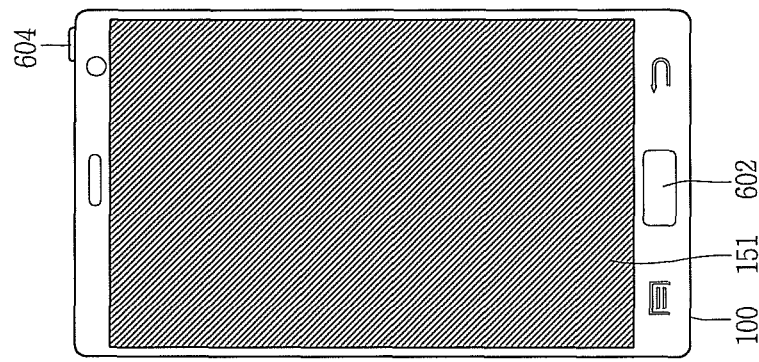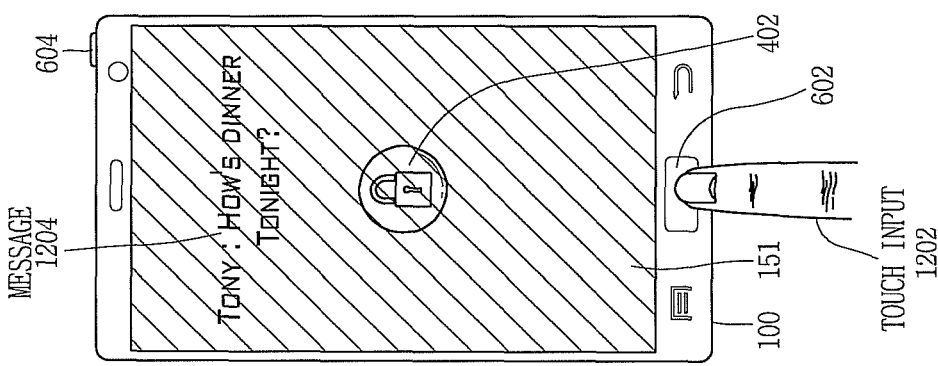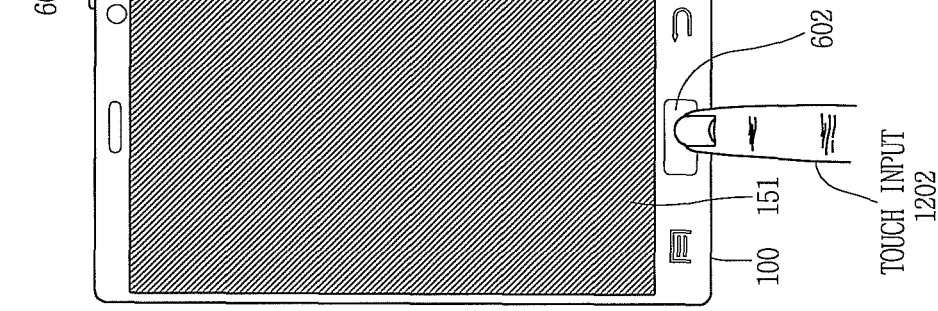

SCREEN BRIGHTNESS CONTROL FOR MOBILE DEVICE

CROSS-REFERENCE TO RELATED APPLICATIONS

Pursuant to 35 U.S.C. §119(d), this application claims the benefit of priority from Russian Patent Application No. 2012141986, filed on Oct. 2, 2012, the contents of which is hereby incorporated by reference herein in its entirety.

BACKGROUND

1. Technical Field

Embodiments of the disclosure generally relate to the field of electronics, and more particularly to control methods and systems of mobile devices.

2. Background

Terminal may comprise a mobile terminal or a stationary terminal. The mobile terminal may be further divided into a handheld terminal or vehicle mount terminal. As the features of the mobile terminal are becoming more diverse, the mobile terminal is becoming a multimedia player performing various functions, such as capturing images and video, playing music or media files, playing games, receiving broadcast programs, and so on. Owing to the sophistication of the mobile terminal, the mobile terminal is consuming more power than ever before. One solution to solve this problem may be provision of a high power battery that can sustain longer hours. Alternatively, the mobile terminal may be designed or engineered to consume less amount of power.

The above references are incorporated by reference herein where appropriate for appropriate teachings of additional or alternative details, features and/or technical background.

SUMMARY

This summary is provided to comply with 37 C.F.R. §1.73, requiring a summary of the disclosure briefly indicating the nature and substance of the disclosure. It is submitted with the understanding that it will not be used to interpret or limit the scope or meaning of the claims.

A method, system, and device for controlling screen brightness of a mobile terminal are disclosed. In one aspect, a mobile terminal comprises a display unit, a sensing unit, and a controller configured to maintain a brightness of the display unit at a reduced level of screen brightness during a non-active state of the mobile terminal, and restore the brightness of the display unit to a normal level of screen brightness after a short timeout subsequent to a detection of an event configured to activate the mobile terminal via the sensing unit.

In another aspect, a method of a mobile terminal comprises maintaining a brightness of a display unit of the mobile terminal at a reduced level of screen brightness during a non-active state of the mobile terminal, and restoring the brightness of the display unit to a normal level of screen brightness after a short timeout subsequent to a detection of an event configured to activate the mobile terminal via a sensing unit of the mobile terminal.

In yet another aspect, a method of a mobile terminal comprises maintaining a brightness of a display unit of the mobile terminal at a reduced level of screen brightness during a non-active state of the mobile terminal. The method also comprises starting a timer for a short timeout in response to a detection of an event, wherein the brightness of the display unit of the mobile terminal is controlled to be at a low level of screen brightness than a normal level of screen brightness during the short timeout. The method further comprises setting the brightness of the display unit to the normal level of screen brightness upon completion of the short timeout if the event is configured to place the mobile terminal in an active state, or restoring the brightness of the display unit to the reduced level of screen brightness if the event is configured to place the mobile terminal in the non-active state.

Other features of the embodiments will be apparent from the accompanying drawings and from the detailed description that follows.

BRIEF DESCRIPTION OF THE VIEWS OF DRAWINGS

The embodiments will be described in detail with reference to the following drawings in which like reference numerals refer to like elements wherein:

Example embodiments are illustrated by way of example and not limitation in the figures of the accompanying drawings, in which like references indicate similar elements and in which:

FIGS. 4A-4D illustrate exemplary views of the mobile terminal controlling screen brightness upon receipt of an incoming call, according to one embodiment.

FIGS. 5A-5D illustrate exemplary views of the mobile terminal controlling screen brightness upon receipt of a touch input, according to one embodiment.

FIGS. 6A-6D illustrate exemplary views of the mobile terminal controlling screen brightness upon unlocking of the screen, according to one embodiment.

FIGS. 7A-7C illustrate exemplary views of the mobile terminal controlling screen brightness upon activation of one or more modules of the mobile terminal, according to one embodiment.

FIGS. 8A-8D illustrate another exemplary views of the mobile terminal controlling screen brightness upon activation of one or more modules of the mobile terminal, according to one embodiment.

FIGS. 10A-10C illustrate exemplary views of the mobile terminal controlling screen brightness when viewing time, according to one embodiment.

FIGS. 12A-12C illustrate exemplary views of the mobile terminal controlling screen brightness when checking missed incoming messages, according to one embodiment.

Figure 1:
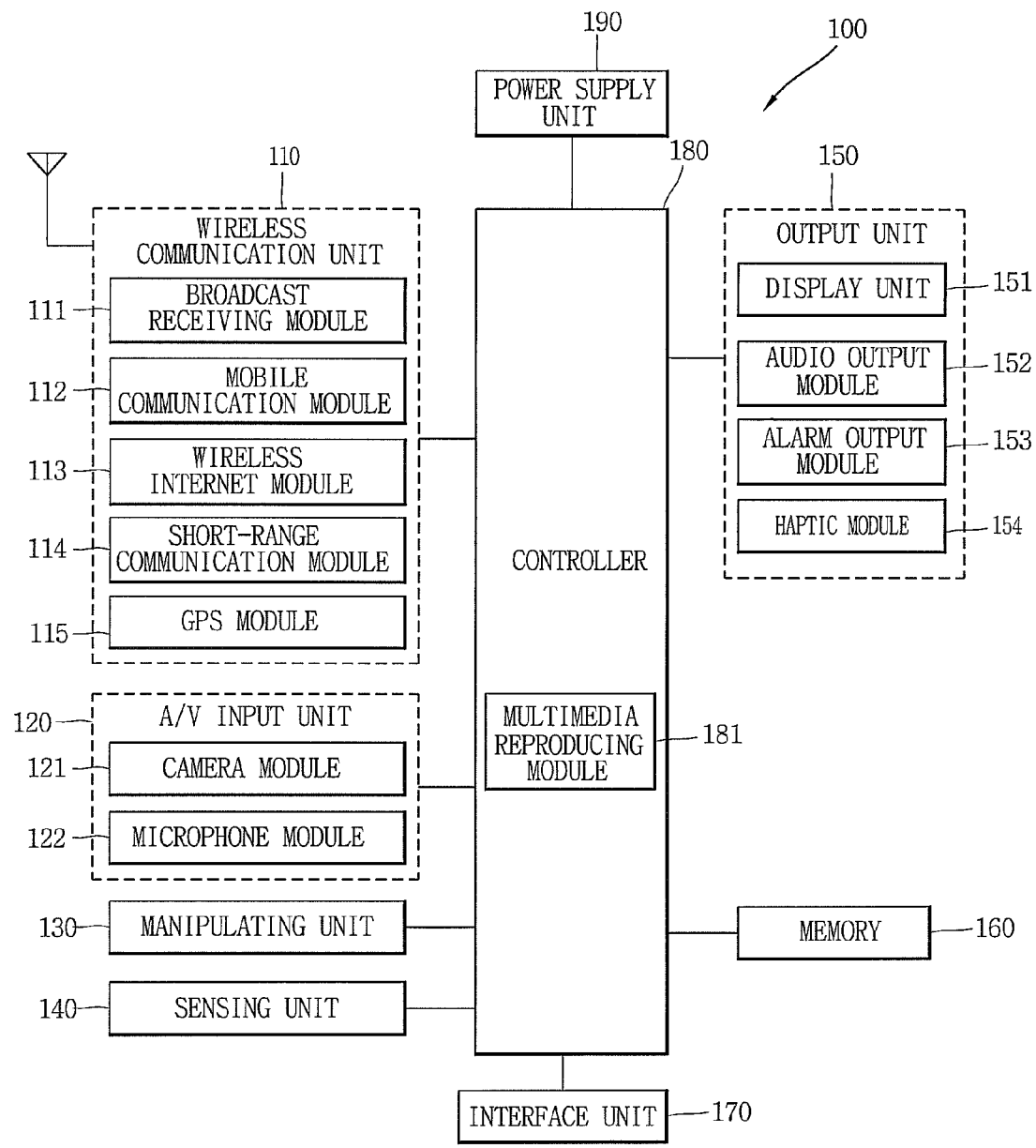
FIG. 1 illustrates an exemplary schematic block diagram of a mobile terminal according to one embodiment.

Other features of the present embodiments will be apparent from the accompanying drawings and from the detailed description that follows. Further, the drawings described herein are for illustration purposes only and are not intended to limit the scope of the present disclosure in any way.

DETAILED DESCRIPTION

A method, device and/or system for controlling screen brightness of a mobile terminal are disclosed. Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the embodiments disclosed herein, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the technological spirit disclosed herein by the accompanying drawings.

A mobile terminal disclosed herein may include a portable phone, a smart phone, a laptop computer, a digital broadcast terminal, a personal digital assistant (PDA), a portable multimedia player (PMP), a navigation, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 illustrates an exemplary schematic block diagram of a mobile terminal 100 according to one embodiment. The mobile terminal 100 may include a wireless communication unit 110, an audio/video (AN) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements will be described in sequence. The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160. The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception. The mobile communication module 112 may be configured to implement a video communication mode and a voice communication mode. The video communication mode refers to a configuration in which communication is made while viewing an image of the counterpart, and the voice communication mode refers to a configuration in which communication is made without viewing an image of the counterpart. The mobile communication module 112 may be configured to transmit or receive at least one of voice or image data to implement the video communication mode and voice communication mode.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like. The short-range communication module 114 is a module for supporting a short-range communication. Here, it may be used a short-range communication technology including Bluetooth, Radio Frequency IDentification (RFID), Infrared Data Association (IrDA), Ultra Wide-Band (UWB), ZigBee, and the like. The location information module 115 is a module for checking or acquiring a location of the mobile terminal, and there is a GPS module as a representative example.

Referring to FIG. 1, the A/V (audio/video) input unit 120 receives an audio or video signal, and the A/V (audio/video) input unit 120 may include a camera 121 and a microphone 122. The camera 121 processes an image frame, such as still picture or video, obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal. The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body. Two or more display units 151 may be implemented according to a configured aspect of the mobile terminal 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an inter-layer structure (hereinafter, referred to as a "touch screen"), the display unit 151 may be used as an input device rather than an output device. The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When there is a touch input to the touch sensor, the corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor. The examples of the proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer. The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner. The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like. The haptic module 154 may be configured to transmit tactile effects through a user's direct contact, or a user's muscular sense using a finger or a hand. The haptic module 154 may be implemented in two or more in number according to the configuration of the mobile terminal 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen. The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port. Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 for reproducing multimedia data. The multimedia module 181 may be implemented in an integrated manner within the controller 180 or may be implemented in a separate manner from the controller 180. Furthermore, the controller 180 can perform a pattern recognition processing so as to recognize writing or drawing input on the touch screen as text or image. Furthermore, the controller 180 may implement a lock state for limiting the user's control command input to applications when the state of the mobile terminal satisfies the prescribed condition. Furthermore, the controller 180 may control a lock screen displayed in the lock state based on a touch input sensed over the display unit 151 (hereinafter, referred to as a "touch screen") in the lock state. The power supply unit 190 receives external power and internal power under the control of the controller 180 to provide power required by various components.

Various embodiments described herein may be implemented in a medium that can be read by a computer or similar device using software, hardware, or any combination thereof. For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself. For software implementation, the embodiments such as procedures or functions may be implemented together with separate software modules. The software modules may perform at least one function or operation described herein. Software codes can be implemented by a software application written in any suitable programming language. The software codes may be stored in the memory 160 and executed by the controller 180. Hereinafter, a mobile terminal according to an embodiment of the present disclosure described in FIG. 1, or a mobile terminal disposed with constituent elements of the mobile terminal, or the structure of a mobile terminal will be described.

Figure 2A:
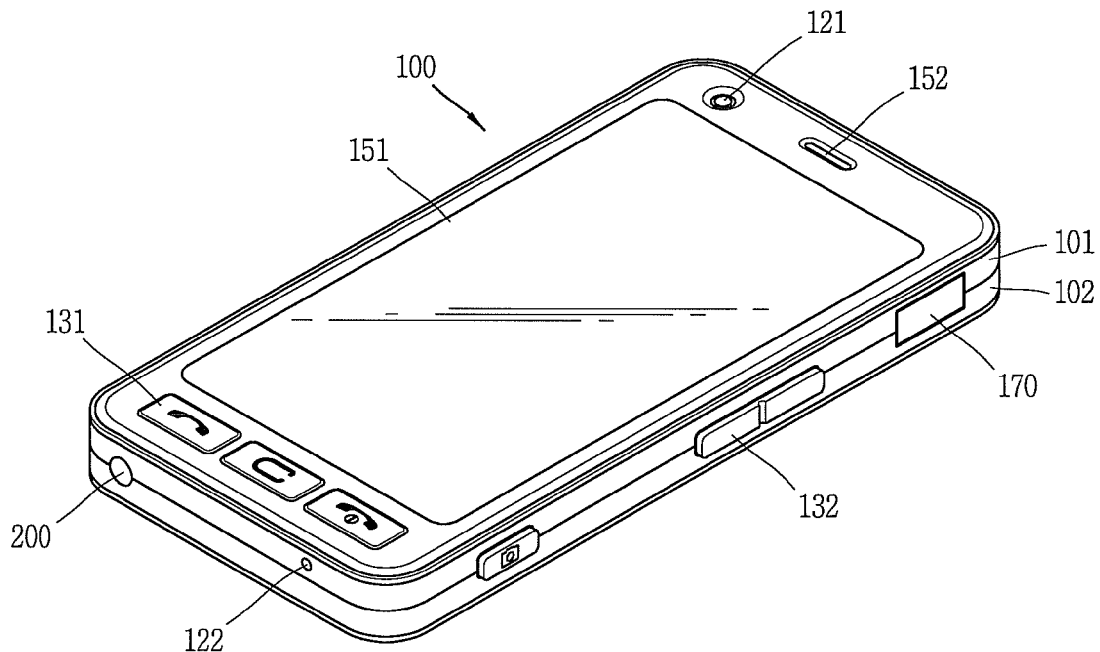
FIG. 2A is a front perspective view illustrating an example of the mobile terminal.
Figure 2B:
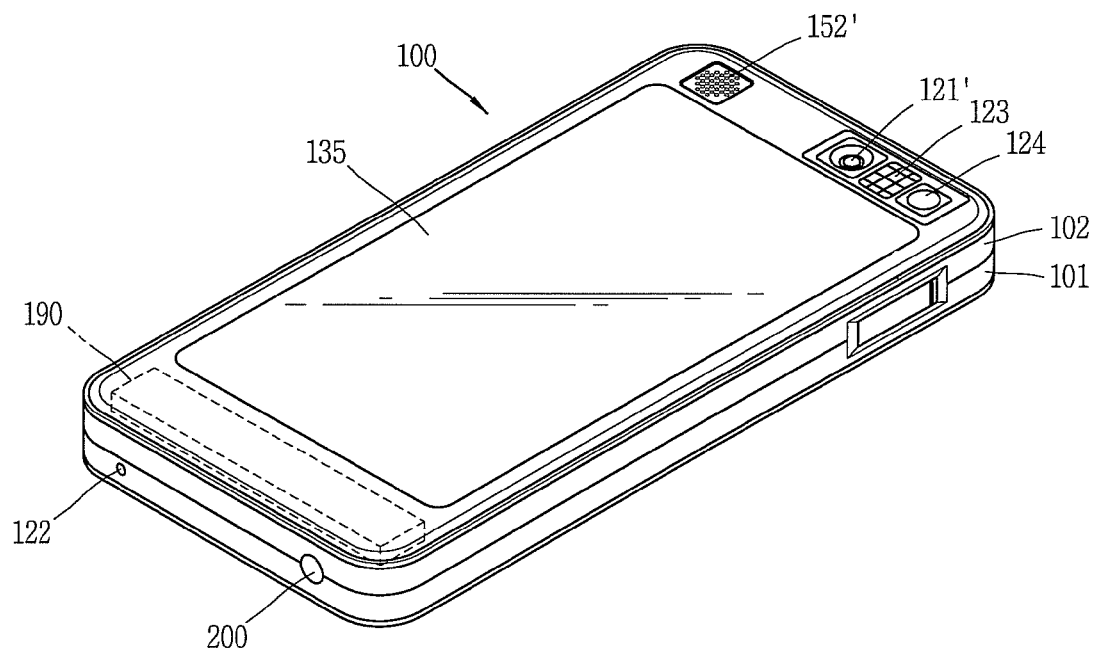
FIG. 2B is a rear perspective view illustrating the mobile terminal in FIG. 2A, according to an embodiment of the present disclosure.

FIG. 2A is a front perspective view illustrating an example of the mobile terminal 100, and FIG. 2B is a rear perspective view illustrating the mobile terminal 100 in FIG. 2A, according to an embodiment of the present disclosure. The mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

According to the drawing, the terminal body 100 (hereinafter, referred to as a "body") may include a front surface, a lateral surface, and a rear surface. Furthermore, the body may include both ends thereof formed along the length direction. The body 100 includes a case (casing, housing, cover, etc.) forming an appearance of the terminal. In this embodiment, the case may be divided into a front surface (hereinafter, referred to as a "front case") 101 and a rear surface (hereinafter, referred to as a "rear case") 102. Various electronic components may be incorporated into a space formed between the front case 101 and rear case 102. At least one middle case may be additionally disposed between the front case 101 and the rear case 102. The cases may be formed by injection-molding a synthetic resin or may be also formed of a metal material such as stainless steel (STS), titanium (Ti), or the like.

A display unit 151, an audio output module 152, a camera 121, a user input unit 130 (130/131, 132), a microphone 122, an interface 170, and the like may be arranged on the terminal body 100, mainly on the front case 101. The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102. On the contrary, the microphone 122 may be disposed at the other end of the body 100.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling. The content inputted by the manipulation units 131, 132 may be set in various ways. For example, the first manipulation unit 131 may receive a command, such as start, end, scroll, or the like, and the second manipulation unit 132 may receive a command, such as controlling a volume level being outputted from the audio output unit 152, or switching it into a touch recognition mode of the display unit 151.

Furthermore, an audio output unit 152' may be additionally disposed on a rear surface of the terminal body. The audio output unit 152' together with the audio output unit 152 (refer to FIG. 2A) can implement a stereo function, and it may be also used to implement a speaker phone mode during a phone call. Furthermore, a power supply unit 190 for supplying power to the mobile terminal 100 may be mounted on a rear surface of the terminal body. The power supply unit 190 may be configured so as to be incorporated in the terminal body, or directly detachable from the outside of the terminal body. Furthermore, a touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

Furthermore, a camera 121' may be additionally mounted on the rear case 102 of the terminal body. The camera 121' has an image capturing direction, which is substantially opposite to the direction of the camera 121 (refer to FIG. 2A), and may have different pixels from those of the first video input unit 121. For example, that the camera 121 may preferably have a relatively small number of pixels enough not to cause a difficulty when the user captures his or her own face and sends it to the other party during a video call or the like, and the camera 121' has a relatively large number of pixels since the user often captures a general object that is not sent immediately. The cameras 121' may be provided in the terminal body 100 in a rotatable and popupable manner. Furthermore, a flash 123 and a mirror 124 may be additionally disposed adjacent to the camera 121'. The flash 123 illuminates light toward an object when capturing the object with the camera 121'. The mirror allows the user to look at his or her own face, or the like, in a reflected way when capturing himself or herself (in a self-portrait mode) by using the camera 121'.

A touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102. The touch pad 135 operates in a reciprocal relation to the display unit 151 of the front case 101. The touch pad 135 may be disposed in parallel on a rear side of the display unit 151. The touch pad 135 may have the same or a smaller size as or than that of the display unit 151.

Figure 3:
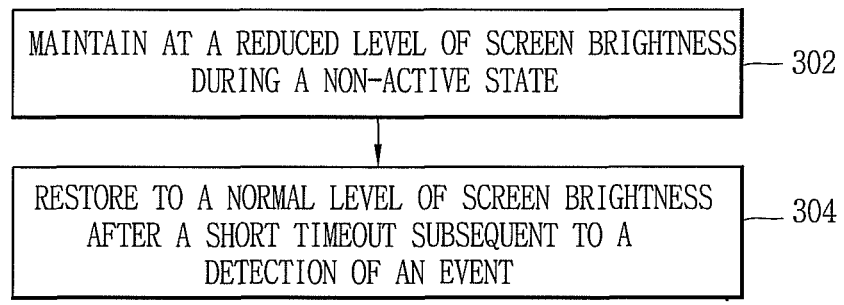
FIG. 3 illustrates a process flow chart of an exemplary method executed by the mobile terminal to control screen brightness, according to one embodiment.

FIG. 3 illustrates a process flow chart of an exemplary method executed by the mobile terminal 100 to control screen brightness, according to one embodiment. In operation 302, the screen brightness of the mobile terminal 100 is maintained at a reduced level during a non-active state (e.g., an idle state or a sleep state). In operation 304, the screen brightness of the mobile terminal 100 is restored to a normal level after a short timeout subsequent to a detection of an event. For example, the screen brightness of the mobile terminal 100, which has been at the reduced level, may increase to the normal level after the short timeout of three (3) seconds subsequent to a detection of a touch input applied on to the display unit 151 or the screen of the mobile terminal 100. It is appreciated that the screen brightness at the reduced level may illuminate less amount of light than the screen brightness at the normal level, and thus the screen brightness at the reduced level may consume less amount of power than the screen brightness at the normal level. It is also appreciated that the methods disclosed in FIG. 3 may be implemented in a form of a machine-readable medium embodying a set of instructions that, when executed by a machine, cause the machine to perform any of the operations disclosed herein.

FIGS. 4A-4D illustrate exemplary views of the mobile terminal 100 controlling screen brightness upon receipt of an incoming call 404, according to one embodiment. In FIG. 4A, the mobile terminal 100 is in a sleep state or lock mode, where the screen brightness of the mobile terminal 100 is maintained at the lowest level (e.g., pitch dark). In FIG. 4B, upon receipt of the incoming call 404, the mobile terminal 100 increases the screen brightness to a level which allows the user to see a lock image 402 of the mobile terminal 100 as well as the identification (ID) of the incoming call 404.

In one embodiment, upon the receipt of the incoming call 404, the screen brightness of the mobile terminal 100 is increased to and maintained at the reduced level. It is appreciated that the reduced level of screen brightness may be lower in illumination than the normal level of the screen brightness which may be maintained during the active state or active mode of the mobile terminal 100, such as when one or more applications are being executed.

In one embodiment, as illustrated in FIG. 4C, subsequent to the receipt of the incoming call 404 and the adjustment of the screen brightness at the reduced level, there may be a short timeout, during which the reduced level of the screen brightness is maintained, before the screen brightness of the mobile terminal 100 is increased to the normal level as the mobile terminal 100 enters the active state or active mode, as illustrated in FIG. 4D. In one exemplary implementation, the short timeout may last three (3) seconds. During the short timeout, the user may have a chance to view or check the incoming call 404 and proceed to take the incoming call 404, or to put the mobile terminal 100 back to the non-active state. Thus, the mobile terminal 100 illustrated in FIGS. 4A-4D may consume less amount of power than the conventional mobile terminal since the screen brightness of the conventional mobile terminal is immediately increased to the normal level upon detection of an event (e.g., the incoming call 404).

FIGS. 5A-5D illustrate exemplary views of the mobile terminal 100 controlling screen brightness upon receipt of a touch input 504, according to one embodiment. In FIG. 5A, the display unit 151 of the mobile terminal 100 is in a standby state, where the screen brightness of the mobile terminal 100 is maintained at the reduced level. Since some light is illuminated via the display unit 151 during the standby state, the user may be able to see icons representing applications 502.

In one embodiment, as illustrated in FIGS. 5B and 5C, subsequent to the receipt of the touch input 504, there may be a short timeout, during which the reduced level of the screen brightness is maintained, before the screen brightness of the mobile terminal 100 is increased to the normal level as the mobile terminal 100 enters the active state or active mode, as illustrated in FIG. 5D. It one exemplary implementation, the short timeout may last three (3) seconds. Accordingly, the mobile terminal 100 illustrated in FIGS. 5A-5D may consume less amount of power than the conventional mobile terminal since the screen brightness of the conventional mobile terminal is immediately increased to the normal level upon detection of an event (e.g., the touch input 504).

FIGS. 6A-6D illustrate exemplary views of the mobile terminal 100 controlling screen brightness upon unlocking of the screen, according to one embodiment. In FIG. 6A, the mobile terminal 100 is in the sleep state or lock mode, where the screen brightness of the mobile terminal 100 is maintained at the lowest level (e.g., pitch dark). When a main button 602 or a top button 604 of the mobile terminal 100 is pressed using a touch input 606 as in FIG. 6A, the mobile terminal 100 increases the screen brightness to the reduced level which allows the user to view the lock image 402 of the mobile terminal 100.

In one embodiment, as illustrated in FIGS. 6B and 6C, upon unlocking of the mobile terminal 100, for example through pressing the lock image 402 using a touch input 608, there may be a short timeout, during which the reduced level of the screen brightness is maintained, before the screen brightness of the mobile terminal 100 is increased to the normal level as the mobile terminal 100 enters the active state or active mode, as illustrated in FIG. 6D. It one exemplary implementation, the short timeout may last three (3) seconds. During this time out, the display unit 151 of the mobile terminal 100 may maintain the screen brightness at the reduced level, where the user may still be able to see the icons representing the applications 502 of the mobile terminal 100. Accordingly, the mobile terminal 100 illustrated in FIGS. 6A-6D may consume less amount of power than the conventional mobile terminal since the screen brightness of the mobile terminal is immediately increased to the normal level upon detection of an event (e.g., unlocking of the screen).

FIGS. 7A-7C illustrate exemplary views of the mobile terminal 100 controlling screen brightness upon activation of one or more modules of the mobile terminal 100, according to one embodiment. In FIG. 7A, the mobile terminal 100 is in the sleep state or lock mode, where the screen brightness of the mobile terminal 100 is maintained at the lowest level (e.g., pitch dark). When the main button 602 or the top button 604 of the mobile terminal 100 is pressed using a touch input 702 as in FIG. 7A, the mobile terminal 100 increases the screen brightness to the reduced level which allows the user to view the lock image 402 of the mobile terminal 100 as in FIG. 7B.

In one embodiment, as illustrated in FIGS. 7B and 7C, when the mobile terminal 100 is turned on, there may be a short timeout, during which the reduced level of the screen brightness is maintained, before the one or more modules of the mobile terminal 100 become activated or complete their initialization and the screen brightness of the mobile terminal 100 is increased to the normal level as the mobile terminal 100 enters the active state or active mode, as illustrated in FIG. 7C. It one exemplary implementation, the short timeout may last until status icons 704 (e.g., a status icon for a battery level 706, a status icon for signal strength 708, a status icon for 3G 710 (i.e., a third generation (3G) of mobile telecommunications technology module), a status icon for Wi-Fi 712 or other type of WLAN, a status icon for Bluetooth 714 or other type of PAN, or a long term evolution (LTE) communications technology module) are displayed to indicate the modules of the mobile terminal 100 which correspond to the status icons 704 have completed their initialization and/or are now active.

During this time out, the display unit 151 of the mobile terminal 100 may maintain the screen brightness at the reduced level, where the user may still be able to see the lock image 402 or any other images on the screen. Accordingly, the mobile terminal 100 illustrated in FIGS. 7A-7C may consume less amount of power than the conventional mobile terminal since the screen brightness of the conventional mobile terminal is immediately increased to the normal level upon detection of the event (e.g., the power on of the mobile terminal 100).

FIGS. 8A-8D illustrate another exemplary views of the mobile terminal 100 controlling screen brightness upon activation of one or more modules of the mobile terminal 100, according to one embodiment. In FIG. 8A, the mobile terminal 100 is in the sleep state or lock mode, where the screen brightness of the mobile terminal 100 is maintained at the lowest level (e.g., pitch dark). When the main button 602 or the top button 604 of the mobile terminal 100 is pressed using a touch input 802 as in FIG. 8A, the mobile terminal 100 increases the screen brightness to the reduced level which allows the user to view the lock image 402 or any other images on the display unit 151 of the mobile terminal 100 as in FIG. 8B.

In one embodiment, as illustrated in FIGS. 8B-8D, when the mobile terminal 100 is turned on, there may be a short timeout, during which the level of the screen brightness is progressively increased according to an increase in the number of the modules which become activated. It one exemplary implementation, the short timeout may last until all of the status icons 704 are displayed to indicate the modules of the mobile terminal 100 which corresponds to the status icons 704 have completed their initialization and/or are now active as in FIG. 8D. During the short time out, as illustrated in FIG. 8C, the screen brightness of the mobile terminal 100 increases from the reduced level as the modules represented by the status icon for the battery level 706 and the status icon for the signal strength 708 become fully operational, where the increased level of the screen brightness is still less than the normal level of the screen brightness in the illumination measure and/or power consumption. In one exemplary implementation, the reduced level of screen brightness, the increased level of screen brightness, or the normal level of screen bright is set according to a user input via a user interface.

Further, as illustrated in FIG. 8D, the screen brightness of the mobile terminal 100 increases to the active level as all of the modules represented by the status icons 704 become fully operational. Accordingly, the mobile terminal 100 illustrated in FIGS. 8A-8D may consume less amount of power than the conventional mobile terminal since the screen brightness of the conventional mobile terminal is immediately increased to the normal level when the mobile terminal 100 is turned on.

Figure 9:
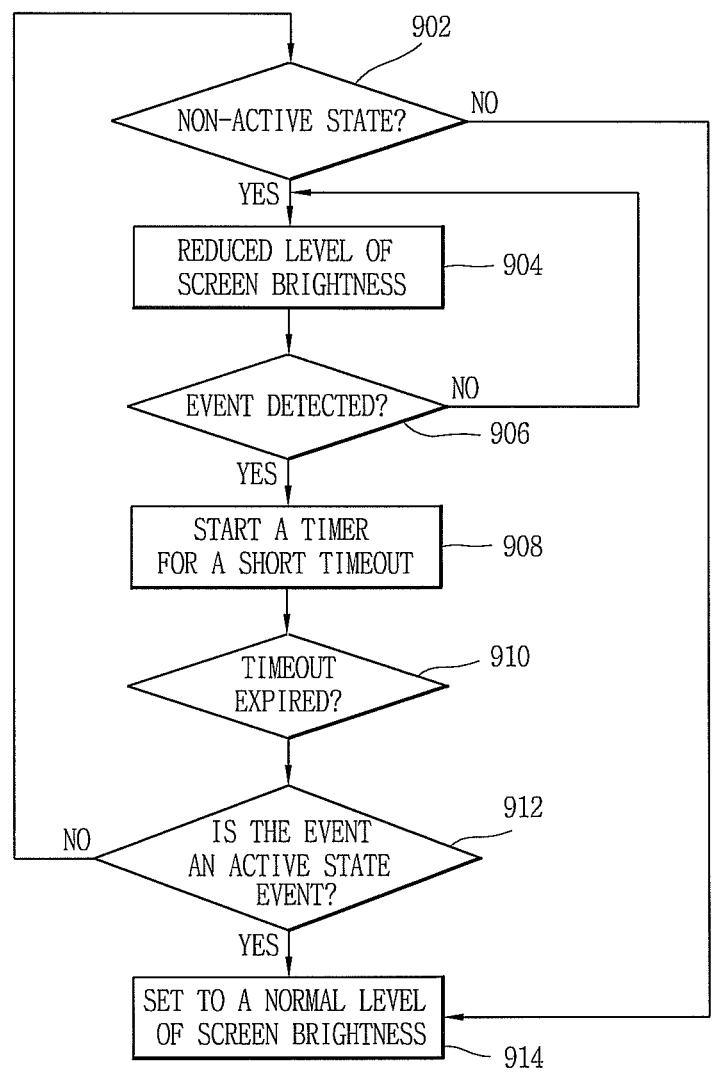
FIG. 9 illustrates a process flow chart of another exemplary method executed by the mobile terminal to control screen brightness, according to one embodiment.

FIG. 9 illustrates a process flow chart of another exemplary method executed by the mobile terminal 100 to control screen brightness, according to one embodiment. In operation 902, the operational status of the mobile terminal is determined. If the mobile terminal 100 is in the active state or active mode, the screen brightness of the mobile terminal 100 is maintained at the normal level as in operation 914. However, if the mobile terminal 100 is in the inactive or non-active state or mode, the screen brightness of the mobile terminal 100 is maintained at the reduced level of screen brightness as in operation 904. In addition, if an event (e.g., a touch input, an incoming call, an incoming message, a power on, etc.) is detected, a timer for a short timeout (e.g., two to four seconds) is triggered as in operation 908.

Once the short timeout tracked by the timer is expired in operation 910, it is determined whether the event is configured to turn the mobile terminal 100 into the active state or not in operation 912. In one exemplary implementation, the active state event or active mode event may be generated when the mobile terminal 100 is turned on or when the mobile terminal 100 is unlocked, whereas the non-active state event or non-active mode event may be generated by touching the screen to view the time, check the missed calls, or check the missed messages. It is appreciated that the active or non-active events may be configured by the user via a user interface, or a default version of the classification may be provided. If the event is determined as the active state event, the screen brightness of the mobile terminal 100 is set to the normal level as in operation 914. However, if the event is determined as the non-active state event, the screen brightness of the mobile terminal is maintained at the reduced level as in operation 904.

It is appreciated that the methods disclosed in FIG. 9 may be implemented in a form of a machine-readable medium embodying a set of instructions that, when executed by a machine, cause the machine to perform any of the operations disclosed herein.

FIGS. 10A-10C illustrate exemplary views of the mobile terminal 100 controlling screen brightness when viewing time 1004, according to one embodiment. FIGS. 10A-10C illustrate exemplary views of the mobile terminal 100 controlling screen brightness upon activation of one or more modules of the mobile terminal 100, according to one embodiment. In FIG. 10A, the mobile terminal 100 is in the sleep state or lock mode, where the screen brightness of the mobile terminal 100 is maintained at the lowest level (e.g., pitch dark). When the main button 602 or the top button 604 of the mobile terminal 100 is pressed using a touch input 1002 as in FIG. 10A, the mobile terminal 100 increases the screen brightness to the reduced level which allows the user to view the lock image 402 of the mobile terminal 100 as in FIG. 10B.

In one embodiment, as illustrated in FIG. 10B, when the mobile terminal 100 is turned on, there may be a short timeout, during which the reduced level of the screen brightness is maintained and the determination of whether to activate the mobile terminal 100 or return to the non-active state (e.g., the sleep state or idle state) is made. It one exemplary implementation, when the mobile terminal 100 is turned on, the time 1004 and the lock image 402 may be displayed on the display unit 151. During the short timeout (e.g., three seconds), if there is no further input by the user, the mobile terminal 100 may presume that the touch input 1002 of the user on the main button 602 was to view or check the time 1004 or that the touch input 1002 was accidental. Accordingly, upon the expiration of the short timeout, the mobile terminal 100 is automatically put to the non-active state or mode as illustrated in FIG. 10C.

Thus, the mobile terminal FIGS. 10A-10C may consume less amount of power than the conventional mobile terminal since the screen brightness of the conventional mobile terminal is immediately increased to the normal level as soon as the mobile terminal 100 is turned on. As illustrated in FIGS. 10B, the mobile terminal 100 is maintained at the reduced level at most for the duration of the short timeout (e.g., three seconds) subsequent to the detection of the event (e.g., powering on of the mobile terminal 100) before the mobile terminal 100 is automatically turned off as in FIG. 10C.

Figure 11C:
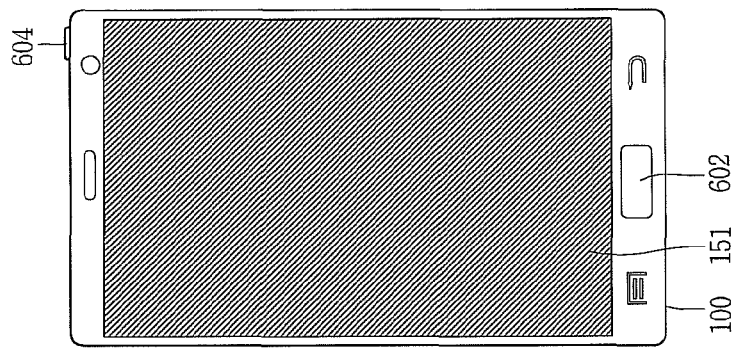
FIGS. 11A-11C illustrate exemplary views of the mobile terminal controlling screen brightness when checking missed calls, according to one embodiment.
Figure 11B:
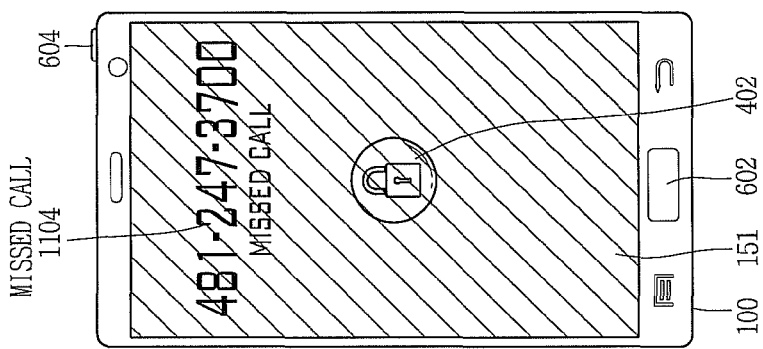
Figure 11A:
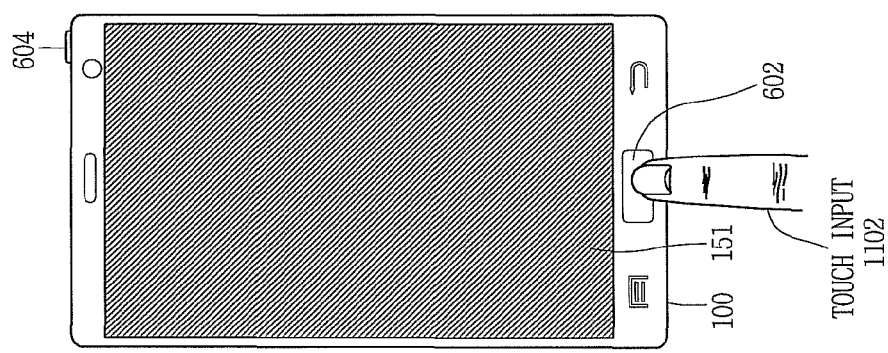

FIGS. 11A-11C illustrate exemplary views of the mobile terminal 100 controlling screen brightness when checking missed calls 1104, according to one embodiment. In FIG. 11A, the mobile terminal 100 is in the sleep state or lock mode, where the screen brightness of the mobile terminal 100 is maintained at the lowest level (e.g., pitch dark). Once the main button 602 or the top button 604 of the mobile terminal 100 is pressed using a touch input 1102 as in FIG. 11A, the mobile terminal 100 increases the screen brightness to the reduced level which allows the user to view the lock image 402 of the mobile terminal 100 as in FIG. 11B.

In one embodiment, as illustrated in FIG. 11B, once the mobile terminal 100 is turned on, there may be a short timeout, during which the reduced level of the screen brightness is maintained and the determination of whether to activate the mobile terminal 100 or return to the non-active state (e.g., the sleep state or idle state) is made. It one exemplary implementation, when the mobile terminal 100 is turned on, the missed call(s) 1104 and the lock image 402 may be displayed on the display unit 151. During the short timeout (e.g., three seconds), if there is no further input by the user, the mobile terminal 100 may presume that the touch input 1102 of the user on the main button 602 was just to view or check the missed call(s) 1104 or that the touch input 1102 was accidental. Accordingly, upon the expiration of the short timeout, the mobile terminal 100 is automatically put to the non-active state or mode as illustrated in FIG. 11C.

Thus, the mobile terminal FIGS. 11A-11C may consume less amount of power than the conventional mobile terminal since the screen brightness of the conventional mobile terminal is immediately increased to the normal level as soon as the mobile terminal 100 is turned on. As illustrated in FIG. 11B, the mobile terminal 100 is maintained at the reduced level at most for the duration of the short timeout (e.g., three seconds) subsequent to the detection of the event (e.g., powering on of the mobile terminal 100) before the mobile terminal 100 is turned off as in FIG. 11C.

FIGS. 12A-12C illustrate exemplary views of the mobile terminal 100 controlling screen brightness when checking missed incoming message(s) 1204, according to one embodiment. In FIG. 12A, the mobile terminal 100 is in the sleep state or lock mode, where the screen brightness of the mobile terminal 100 is maintained at the lowest level (e.g., pitch dark). Once the main button 602 or the top button 604 of the mobile terminal 100 is pressed using a touch input 1202 as in FIG. 12A, the mobile terminal 100 increases the screen brightness to the reduced level which allows the user to view the lock image 402 of the mobile terminal 100 as in FIG. 12B.

In one embodiment, as illustrated in FIG. 12B, once the mobile terminal 100 is turned on, there may be a short timeout, during which the reduced level of the screen brightness is maintained and the determination of whether to activate the mobile terminal 100 or return to the non-active state (e.g., the sleep state or idle state) is made. It one exemplary implementation, when the mobile terminal 100 is turned on, the missed message(s) 1204 and the lock image 402 may be displayed on the display unit 151. During the short timeout (e.g., three seconds), if there is no further input by the user, the mobile terminal 100 may presume that the touch input 1202 of the user on the main button 602 was just to view or check the missed message(s) 1204 or that the touch input 1202 was accidental. Accordingly, upon the expiration of the short timeout, the mobile terminal 100 is automatically put to the non-active state or mode as illustrated in FIG. 12C.

Thus, the mobile terminal FIGS. 12A-12C may consume less amount of power than the conventional mobile terminal where the screen brightness of the conventional mobile terminal is immediately increased to the normal level as soon as the mobile terminal 100 is turned on. As illustrated in FIG. 12B, the mobile terminal 100 is maintained at the reduced level at most for the duration of the short timeout (e.g., three seconds) subsequent to the detection of the event (e.g., powering on of the mobile terminal 100) before the mobile terminal 100 is turned off as in FIG. 12C.

In addition to the embodiments utilizing the short timeout as illustrated in FIGS. 3-FIG. 12C, the screen brightness of the display unit 151 may be reduced according to a battery level of the mobile terminal 100 when the battery level of the mobile terminal 100 falls below a threshold level. Further, the screen brightness of the display unit 151 during the night time may be set lower than the brightness of the display unit 151 during day time.

The various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). Further, the various electrical structure and methods may be embodied using transistors, logic gates, and/or electrical circuits (e.g., application specific integrated circuit (ASIC)). Although the present embodiments have been described with reference to specific example embodiments, it will be evident that various modifications and changes may be made to these embodiments without departing from the broader spirit and scope of the various embodiments.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a display;
   a sensor configured to sense an event when the display is in a sleep state, wherein a brightness of the display in the sleep state is at a lowest level; and
   a controller configured to:
   activate the display;
   increase the brightness of the display to a reduced level to display screen information of the event;
   maintain the brightness of the display at the reduced level of screen brightness during a short timeout subsequent; and
   increase the brightness of the display to a normal level in response to a control command during the short timeout subsequent, wherein the controller is configured to decrease the brightness of the display to the lowest level when a control command is not received during the short timeout subsequent.

2. The mobile terminal of claim 1, wherein the event an includes an incoming call or an incoming message.

3. The mobile terminal of claim 1, wherein the event includes a touch on the display.

4. The mobile terminal of claim 3, wherein the controller unlocks the mobile terminal after the touch on the display.

5. The mobile terminal of claim 1, wherein the short timeout lasts until at least one module of the mobile terminal becomes fully operational in response to the event.

6. The mobile terminal of claim 5, wherein the at least one module includes at least one of a wireless local area network (WLAN) module, a Bluetooth module, a third generation (3G) of mobile telecommunications technology module, or a long term evolution (LTE) communications technology module.

7. The mobile terminal of claim 1, wherein the reduced level of screen brightness is lower in illumination than the normal level of screen brightness.

8. A method of a mobile terminal, the method comprising:
   maintaining a brightness of a display of the mobile terminal at a lowest level of screen brightness in a sleep state;
   receiving an event via a sensor;
   activating the display;
   increasing the brightness of the display to a reduced level to display screen information of the event;
   maintaining the brightness of the display of the mobile terminal at the reduced level of screen brightness during a short timeout subsequent; and
   increasing the brightness of the display to a normal level in response to a control command during the short timeout subsequent, wherein the controller is configured to decrease the brightness of the display to the lowest level when a control command is not received during the short timeout subsequent.

9. The method of claim 8, further comprising reducing the brightness of the display according to a battery level of the mobile terminal when the battery level of the mobile terminal falls below a threshold level.

10. The method of claim 8, wherein the increasing the brightness of the display to the normal level of screen brightness comprises setting the brightness of the display during night time lower than the brightness of the display during day time.

11. The method of claim 8, wherein the increasing the brightness of the display comprises setting a duration of the short timeout to last until at least one module of the mobile terminal becomes fully operational past an initialization state in response to the event.

12. A method of a mobile terminal, the method comprising:
   maintaining a brightness of a display of the mobile terminal at a reduced level of screen brightness during a non-active state of the mobile terminal;
   starting a timer for a short timeout in response to a detection of an event, wherein the brightness of the display of the mobile terminal is controlled to be at a lower level of screen brightness than a normal level of screen brightness during the short timeout; and setting the brightness of the display to the normal level of screen brightness upon completion of the short timeout if the event is configured to place the mobile terminal in an active state, or restoring the brightness of the display to the reduced level of screen brightness if the event is configured to place the mobile terminal in the non-active state.

13. The method of claim 12, wherein the reduced level of screen brightness during the non-active state is of a same brightness level with the lower level of screen brightness during the short timeout.

14. The method of claim 12, wherein the reduced level of screen brightness during the non-active state is lower in brightness than the lower level of screen brightness during the short timeout.

15. The method of claim 12, wherein at least one of the reduced level of screen brightness, the lower level of screen brightness, or the normal level of screen brightness is set according to a user input.

16. The method of claim 12, wherein the setting the brightness of the display to the normal level of screen brightness is performed subsequent to the short timeout when the event unlocks a screen of the mobile terminal and places the mobile terminal in the active state.

17. The method of claim 12, wherein the restoring the brightness of the display to the reduced level of screen brightness is performed subsequent to the short timeout, and wherein the event allows a user to briefly view content on the display without unlocking a screen of the mobile terminal.

18. The method of claim 17, wherein the content on the display includes a current time, a missed call, or an incoming message.

19. The mobile terminal of claim 12, wherein the short timeout lasts while configuration of at least one module of the mobile terminal is performed in response to the detection of the event.

* * * * *